April 19, 1949.  H. DIETZ  2,467,817
COFFEE MAKING DEVICE
Filed July 17, 1945   2 Sheets-Sheet 1
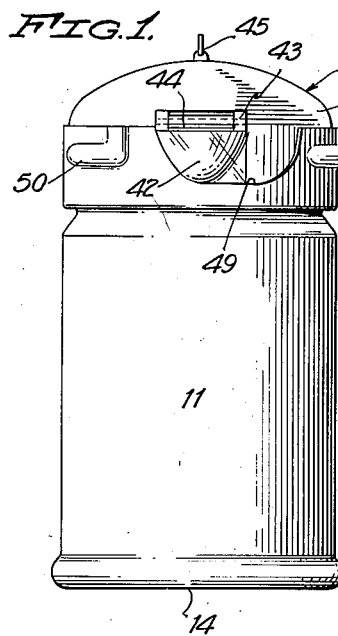
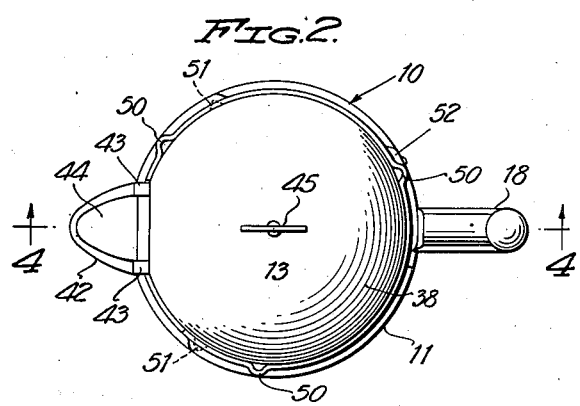
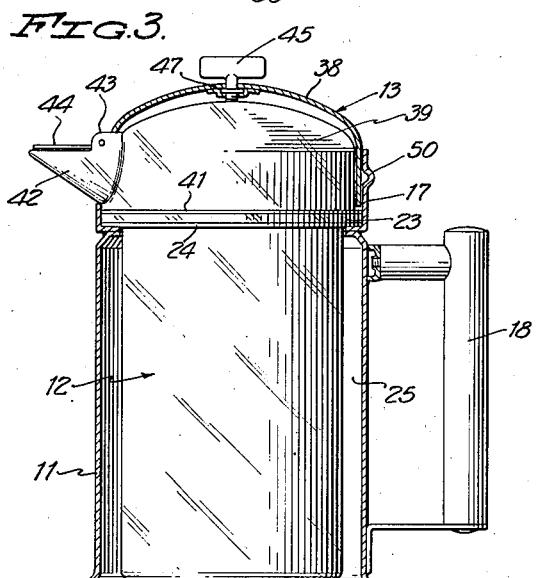
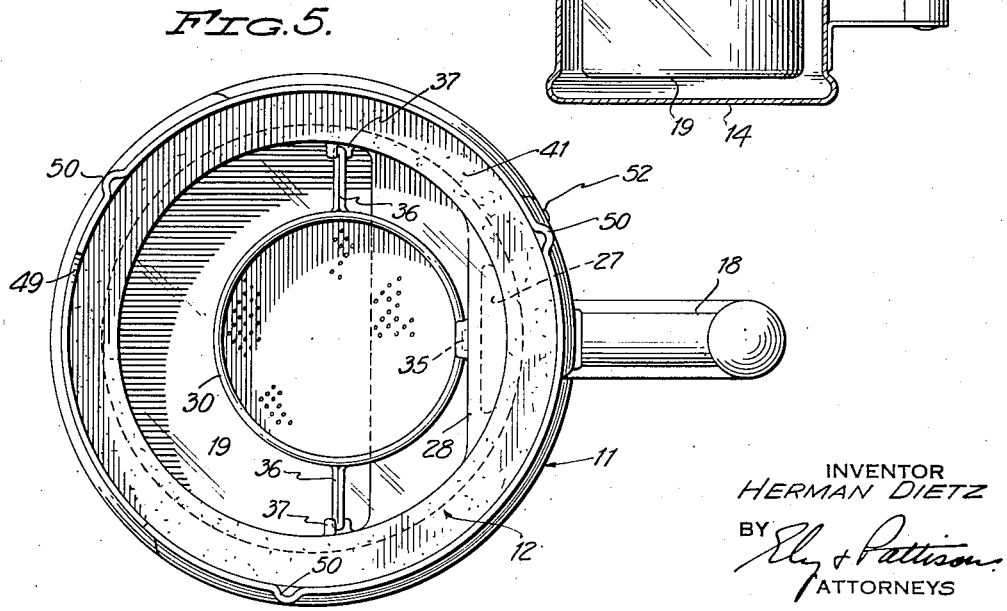
INVENTOR
HERMAN DIETZ
BY
ATTORNEYS April 19, 1949.  H. DIETZ  2,467,817
COFFEE MAKING DEVICE Filed July 17, 1945  2 Sheets-Sheet 2

INVENTOR
HERMAN DIETZ
BY
ATTORNEYS

Patented Apr. 19, 1949

2,467,817

UNITED STATES PATENT OFFICE 2,467,817

COFFEE-MAKING DEVICE

Herman Dietz, Astoria, N. Y.

Application July 17, 1945, Serial No. 605,525

11 Claims. (Cl. 99—303)

This invention relates to improvements in coffee-making devices, although the same may be used in the brewing of tea if so desired.

The primary object of the invention resides in a coffee-making device which automatically makes coffee without raising the coffee brewing water to the boiling point by the action of steam pressure generated within the device.

Another feature of the invention is to provide a coffee-making device in which a vacuum is set up between the inner coffee compartment and the outer side walls of the device to maintain the brewed coffee in a relatively hot condition for a long period of time, thus preserving the original flavor of the coffee.

Another feature of the invention is the provision of a coffee-making device in which the ground coffee is supported within the brewing compartment above the normal level of the brewing water, the level of the water being raised by steam pressure to cause the ground coffee to be submerged in the brewing water for a sufficient time to effect a complete extraction of coffee therefrom.

Other novel features of the invention are to provide a coffee-making device which is economical in that a maximum extraction of coffee is obtained from the ground coffee; to provide a device which makes a tasty non-bitter coffee beverage due to the fact that the brewing water is not in direct heating contact with the flame or heating element and the coffee water does not exceed the boiling point during the brewing operation; to provide a device which produces a vacuum within itself to maintain the coffee hot over a period of hours without loss of the original flavor of the brewed coffee, and to provide a coffee-making device in which the several interfitting parts may be readily separated for cleaning purposes and reassembled for use.

Other novel features of the invention will become apparent as the following specification is read in conjunction with the accompanying drawings, in which, Figure 1 is a front elevational view of a coffee-making device constructed in accordance with my invention.

Figure 2 is a top plan view.

Figure 3 is a vertical longitudinal sectional view with parts in elevation.

Figure 5 is a top plan view with the cover removed.

Figure 4:
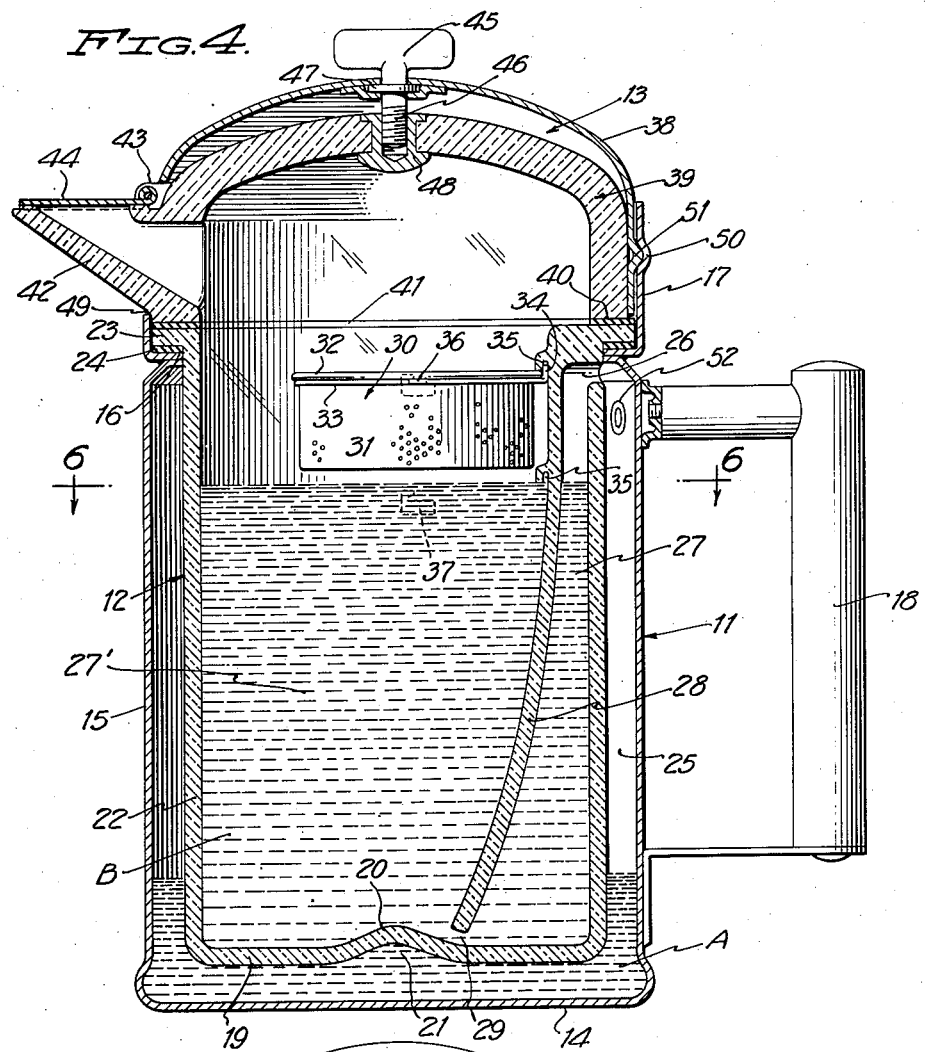
Figure 4 is an enlarged vertical longitudinal sectional view on the line 4—4 of Figure 2.
Figure 6:
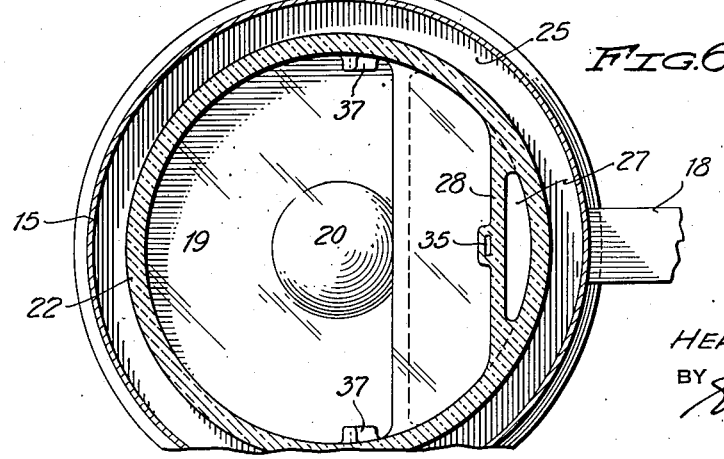
Figure 6 is a fragmentary horizontal sectional view on the line 6—6 of Figure 4.

Referring to the drawings by reference characters, the numeral 10 designates my coffee-making device in its entirety which broadly includes an outer cylindrical receptacle 11, a removable inner cylindrical receptacle 12, and a removable cover or lid 13.

The outer cylindrical receptacle 11 is constructed of metal, such as aluminum, copper, or other material capable of being exposed directly to the heat of a flame or electric heating element. The receptacle 11 comprises a flat bottom wall 14 and a side wall 15 which is round in cross section. The receptacle 11 is open at its top and a suitable distance from the top edge thereof the side wall 15 is provided with an annular flat horizontal flange or shoulder 16 which acts as a seat for the inner receptacle 12 in a manner to be presently explained. That portion of the side wall 15 is termed a collar portion 17 which interlockingly engages the cover 13 as will be hereafter fully explained. The collar portion may be formed integral with the side wall 15 or connected thereto by welding or otherwise. A handle 18 is attached to the side wall 15 and extends outwardly therefrom at what may be considered the rear, in view of the fact that the spout to be described extends from the front of the device.

The inner receptacle 12 is preferably constructed of glass capable of withstanding high temperatures and may be made of such transparent material known under the trade mark "Pyrex." The receptacle 12 includes a flat bottom wall 19 having a central inwardly extending dome-shaped portion 20 forming a concavity 21, and a side wall 22 which is round in cross section and of an exterior diameter substantially equal to the interior diameter of the flange 16 to snugly engage therewith. The upper end of the inner receptacle is provided with an outwardly extending annular flange 23 which overlies the flange 16 and seats thereon, there being a flat rubber sealing ring 24 interposed therebetween. Thus the inner receptacle is supported from the flange 16 of the outer receptacle with the side wall 22 in spaced concentric relation to the side wall 15 of the outer receptacle. The inner receptacle 12 is of a height to cause the bottom wall 19 thereof to be disposed in spaced relation to the bottom wall 14 of the outer receptacle when seated upon the flange or shoulder 16. The space between the inner receptacle 12 and outer receptacle 11 constitutes a water and steam chamber 25. The upper end of the chamber 25 communicates with the inner receptacle through an opening 26, which connects with the upper end of a pocket 27. The pocket 27 is formed by a downwardly extending inwardly flared partition wall 28 which is integral with the side wall 22 and terminates adjacent the bottom wall 19 to provide a communicating passage 29 between the pocket 27 and the bottom of the inner receptacle. The partition wall 28 divides the interior of the inner receptacle into the pocket 27 and a brewing compartment 27'. The construction of the device adjacent the opening 26 forms a passage which puts the steam chamber 25 into communication with the inner receptacle above the level of the water therein.

The upper end of the inner receptacle 12 removably supports a coffee ground holder 30 which comprises a perforated cup-shaped body 31 having an annular bead 32 extending outwardly from its open top edge. Encircling the body 31 and disposed beneath the bead is a ring 33 having an upwardly extending lug 34 which fits into a socket 35 formed in the wall 28. The socket 35 opens downwardly in order to receive the upstanding lug 34. Cooperating with the lug 34 and socket 35 to removably hold the coffee holder 30 in position are diametrically opposed arms 36—36 which respectively seat in notches formed in bosses 37—37 extending inwardly from the side wall 22 of the inner receptacle. The coffee holder 30 may be removed from the inner receptacle by lifting the front end upwardly to cause the lug 34 to clear the socket 35, after which the same may be lifted to cause the arms 36—36 to disengage the notches of the bosses 37—37. Two sets of sockets 35 and notched bosses 37—37 are shown on two different horizontal planes to enable the coffee holder 30 to be set either high or low within the inner receptacle 12 depending upon the volume of coffee to be brewed in the device 10.

The cover or lid 13 includes an outer dome-shaped metal shell member 38 and an inner glass hollow dome-shaped member 39. The inner member 39 has a relatively flat bottom edge 40 which seats upon the flange 23, there being a rubber sealing gasket 41 between the edge 40 and flange 23 to seal the joint therebetween. The inner member is provided with a pouring spout 42 which extends through an opening 43 in the outer member 38. When the device 10 is in an upstanding position, the discharge end of the spout 42 is closed by a gravity-actuated hinged closure 44. The members 38 and 39 are connected together for axial movement relative to each other by a thumb screw 45. The threaded shank 46 of the screw is disposed axially relative to the cover members and is swivelly mounted as at 47 in the outer member 38, while the free end of the shank is threadedly connected to a socket 48 mounted in the top wall of the inner member 39.

The front of the collar portion 17 is cut away as at 49 to accommodate the spout 42 and is of sufficient width to enable a slight turning movement of the inner member 39 relative to the outer member 38. Bayonet slots 50 are formed in the collar 17 to respectively receive and interlock with teats 51 extending outwardly from the annular side wall of the outer member 38. After the teats 51 have initially entered the respective bayonet slots 50, the cover 13 is turned in a clockwise direction relative to the center container 11 to effect an interlocking between these parts. To effect a tight seal between the member 39 of the cover and the inner receptacle 12, the thumb screw is turned to force the member 39 downwardly relative to the member 38.

In use for the brewing of coffee beverage, the cover 13 is removed from its connection with the outer receptacle and the inner receptacle 12 is withdrawn from the outer receptacle 11. A small quantity of water A is placed in the outer receptacle 11. The inner receptacle 12 is filled with a quantity of water B, the amount depending upon the number of cups to be brewed into coffee. Ground coffee is placed in the holder 30 and the same engaged with either the high or low set of supporting means (lugs 37—37 and socket 35). Normally the level of the water B within the inner receptacle 12 is below the bottom of the holder 30 so as to be out of contact therewith. The inner receptacle 12 is now inserted into the outer receptacle 11 with the flange 23 resting upon the flange 16 and the joint therebetween sealed by the gasket 24. The lower end of the inner receptacle is now submerged in the heating water A. The cover 13 is next applied by inserting it into the collar portion 17 of the outer receptacle so that the teats 51 enter the bayonet slots 50, after which the cover is given a slight turn to effect an interlocking of the teats and slots. To effect a tight seal between the member 39 of the cover and the flange 23, and between the flange 23 and flange 16, the screw 45 is turned to force the member 29 downwardly relative to the outer shell 38. The device is now ready to be placed over a flame, electric grill, or other source of intense heat. The source of heat causes the heating water A to heat up to the boiling point and steam therefrom accumulates in the chamber 25 and within the space of the pocket 27 above the head of the water B contained therein, entrance to the pocket being through the passage 26. The bottom and side walls of the inner receptacle 12 are disposed in heat exchange relation to the boiling water A and steam which accumulates in the chamber 25, thus causing the brewing water B to become heated. When the pressure of steam accumulated in the chamber 25 reaches a predetermined high, the same acts upon the head of the water B in the pocket 27 which forces the volume of water in said pocket therefrom through the passage 29, causing the brewing water to rise to a level into contact with the perforated holder 30 containing the ground coffee. The brewing water B which contacts the ground coffee withdraws the coffee extract therefrom, thus the water B is transformed into brewed coffee beverage. After the water in the pocket 27 has been displaced for raising the level of the water B into contact with the coffee holder 30 and the brewing operation is completed, the device is removed from contact with the heating flame or source. The displacement of the water from pocket 27 after the brewing operation creates a vacuum within the space 25 which serves to insulate the major portion of the inner receptacle 12 containing the brewed coffee from the outer receptacle 11 thus keeping the coffee hot for hours after the device has been removed from contact with the source of heat. The brewed coffee within the inner receptacle 12 may be conveniently poured from the device 10 by grasping the handle 18 and tilting the device forwardly so that the brewed coffee flows out through the spout 42, which flow causes the closure 44 to swing open. The closure 44 acts to prevent the escape of heat from the inner receptacle when the device 10 is at rest.

From the foregoing decription and accompanying drawings, it will be understood that the maximum strength of coffee may be extracted from the ground coffee in the holder 30 due to the submerging of the same into the brewing water B when the latter has been indirectly heated to the proper degree of temperature below that of boiling. This eliminates bitterness in the finished brew of coffee. By reason of the creation and maintaining of a vacuum in the space between the inner and outer receptacles, the brewed coffee may be kept hot for relatively long periods of time. The component parts from which the device 10 is constructed are all easily separable to facilitate thorough cleansing for sanitary purposes and are easily reassembled for subsequent use.

Although I have specifically referred to the device 10 for use in the brewing of coffee, the same may be used in the brewing of tea if so desired.

If desired, a safety steam valve 52 may be suitably mounted in the side wall 15 of the outer receptacle 11 to relieve the chamber 25 of dangerous excess steam pressure.

While I have shown and described what I consider to be the preferred embodiment of my invention, I wish it to be understood that such changes in construction, design and materials as come within the scope of the appended claims may be resorted to if desired without departing from the spirit of my invention as set forth therein.

Having thus described my invention, what I claim as new and desire to secure by Letters Patent is:

1. In a coffee or like beverage-making device, an outer receptacle adapted to be placed over a source of heat, an inner receptacle within the outer receptacle in spaced relation to the bottom and side walls thereof, the space between the outer and inner receptacles constituting a water and steam chamber, a partition forming a vertical pocket within said inner receptacle, said device having a passage establishing communication between the pocket and the bottom portion of the inner receptacle and a passage establishing communication between the top of the pocket and said steam and water chamber, and a beverage flavor container mounted within the inner receptacle and disposed above the normal level of brewing water adapetd to be contained within the inner receptacle and pocket.

2. In a coffee or like beverage-making device as set forth in claim 1 in which the partition is inclined and the pocket increases in cross sectional area from the upper end to the lower end thereof.

3. In a coffee or like beverage-making device, an outer cylindrical receptacle for direct contact with a source of heat, an inner cylindrical receptacle of a cross sectional size less than that of the outer receptacle adapted to contain brewing water, means supporting the inner receptacle within the outer receptacle with their corresponding walls in spaced relation, means for sealing the joint between the inner and outer receptacles, the space between the inner and outer receptacles constituting a water and steam chamber in which a relatively low level quantity of water is adapted to be placed, means forming a vertical pocket in said inner receptacle along the side wall thereof having open communication with the inner receptacle through a passage at the lower end of the pocket, said device also having a communicating passage between the upper end of the pocket and the water and steam chamber, and a flavor holder supported within the inner receptacle above the normal level of the brewing water therein, whereby steam generated in the water and steam generator will act upon the head of brewing water within the pocket to cause the level of the brewing water to rise above the level of the flavor holder to cause the latter to be submerged therein.

4. In a coffee or like beverage-making device, an outer cylindrical receptacle having an inwardly extending seat at its top open end, an inner cylindrical receptacle of a smaller diameter than said outer receptacle having an annular outwardly extending flange at its open top end seated on said seat with the inner receptacle extending within the outer receptacle and disposed in spaced relation to the walls thereof, means for clamping the flange down upon said seat, the space between the outer and inner receptacles constituting a water and steam chamber, a vertically extending partition wall within the inner receptacle dividing the same into a pocket and a brewing compartment, said device having a passage connecting the lower end of the pocket and the brewing compartment and a steam passage connecting the upper end of the water and steam chamber with the pocket, and a flavor holder supported within the brewing compartment and disposed above the normal level of the brewing water adapted to be contained therein.

5. In a coffee or like beverage-making device, an outer cylindrical receptacle having an inwardly extending seat at its top open end, an inner cylindrical receptacle of a smaller diameter than said outer receptacle having an annular outwardly extending flange at its open top end seated on said seat with the inner receptacle extending within the outer receptacle and disposed in spaced relation to the walls thereof, the space between the outer and inner receptacle constituting a water and steam chamber, a vertically extending partition wall within the inner receptacle dividing the same into a pocket and a brewing compartment, said device having a passage connecting the lower end of the pocket and the brewing compartment and a steam passage connecting the upper end of the water and steam chamber with the pocket, and a flavor holder supported within the brewing compartment and disposed above the normal level of the brewing water adapted to be contained therein, a cover seated upon the flange, and clamping means for forcibly holding the cover upon said flange and the flange tight against said seat.

6. In a coffee or like beverage-making device as set forth in claim 5 in which the cover is dome shaped, a pouring spout provided on said cover and extending therefrom, and a handle provided on the outer receptacle to facilitate lifting of the device for pouring of the brewed contents therefrom.

7. In a coffee or like beverage-making device, a brewing receptacle adapted to contain brewing water, a water and steam jacket surrounding said receptacle, means forming a pressure pocket provided within the receptacle and communicating therewith adjacent the bottom thereof, said device having a passage connecting the upper end of the pocket to said water and steam jacket, a flavoring holder mounted in the receptacle above the normal level of the brewing water therein, whereby steam pressure generated in the jacket will act upon the head of brewing water in the pocket and force the same from the pocket to raise the level of the brewing water to that of the flavoring holder.

8. In a coffee or the like beverage-making device as set forth in claim 7 in which a vacuum is created within the jacket after expulsion of brewing water from the pocket to insulate the brewing receptacle and maintain the temperature of the brewed beverage therein.

9. A coffee or like beverage-making device comprising in combination an outer cylindrical receptacle having an annular inwardly disposed seat at its open top, an inner cylindrical receptacle of an external diameter less than the internal diameter of the outer receptacle having an annual outwardly extending flange seated on the seat with the inner receptacle depending into the outer receptacle in spaced relation to the walls thereof, the space between the outer and inner receptacles constituting a water and steam chamber, a vertical partition wall within the inner receptacle dividing the same into a water brewing compartment and a pocket, said device having a water passage between the lower end of the pocket and the water brewing compartment and a steam passage between the upper end of the pocket and the water and steam chamber, a beverage flavoring holder, means for removably supporting the holder within the inner receptacle adjacent the top thereof so as to be disposed above the normal level of the brewing water contained therein, a cover seated upon the flange having a pouring spout, and means for removably fastening the cover to said outer receptacle.

10. A coffee or like beverage-making device as set forth in claim 9 in which the cover includes inner and outer dome shaped members, and screw clamping means connecting said members together and for tightly seating the cover upon the flange, and the flange upon the seat.

11. A coffee or like beverage-making device as set forth in claim 9 including a resilient ring gasket interposed between the flange and seat, a resilient ring gasket interposed between the cover and the flange, and means carried by the cover for pressing the same downwardly to tightly seal the joints between which the gaskets are respectively positioned.

HERMAN DIETZ.

REFERENCES CITED

The following references are of record in the file of this patent:

UNITED STATES PATENTS

| Number | Name | Date |
|---|---|---|
| 150,263 | St. John | Apr. 28, 1874 |
| 1,185,073 | Ehrheart | May 30, 1916 |
| 1,477,340 | Forshee | Dec. 11, 1923 |
| 1,687,095 | Jones | Oct. 9, 1928 |
| 2,102,244 | Walsh | Dec. 14, 1937 |
| 2,246,061 | Nowland | June 17, 1941 |

FOREIGN PATENTS

| Number | Country | Date |
|---|---|---|
| 359,470 | Italy | May 25, 1938 |